(12) United States Patent
Kayama et al.

(10) Patent No.: US 6,404,098 B1
(45) Date of Patent: Jun. 11, 2002

(54) DRIVE UNIT USING SHAPE MEMORY ALLOY

(75) Inventors: Shun Kayama, Saitama; Yasuhiro Kataoka, Kanagawa, both of (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/546,169

(22) Filed: Apr. 11, 2000

(30) Foreign Application Priority Data

Apr. 15, 1999 (JP) .......................................... 11-108507

(51) Int. Cl.[7] .............................................. E05B 63/00
(52) U.S. Cl. ...................................................... 310/307
(58) Field of Search ........................................ 310/307

(56) References Cited

U.S. PATENT DOCUMENTS

| 4,887,430 A | 12/1989 | Kroll ............................ 60/527 |
| 4,979,672 A | 12/1990 | Abujudom ................. 236/68 B |
| 5,070,697 A | 12/1991 | Van Zeggeren .............. 60/527 |
| 5,543,678 A | 8/1996 | Hoiberg ....................... 310/307 |
| 5,637,984 A | 6/1997 | Chu ................................ 322/6 |
| 6,285,286 B1 * | 9/2001 | Tyren et al. .............. 340/572.9 |

FOREIGN PATENT DOCUMENTS

| EP | 0919717 A1 | 2/1999 | ............. F03G/7/06 |
| GB | 2172931 A * | 1/1986 | ................. 310/307 |

* cited by examiner

Primary Examiner—Thomas M. Dougherty
(74) Attorney, Agent, or Firm—Ronald P. Kananen; Rader Fishman & Grauer PLLC (57) ABSTRACT

Disclosed herein is a drive unit using a shape memory alloy including: a shape memory alloy member made from a shape memory alloy, the shape memory alloy member exhibiting superelasticity when being energized; a drive body connected to the shape memory alloy member, the drive body being moved from a stopping position to a specific operational position when the shape memory alloy member is energized; and a locking mechanism for retaining the drive body at the specific operational position. With this configuration, the drive unit using a shape memory alloy is capable of reducing the power consumption as well as miniaturizing the drive unit.

8 Claims, 4 Drawing Sheets

DRIVE UNIT USING SHAPE MEMORY ALLOY

BACKGROUND OF THE INVENTION

The present invention relates to a drive unit using a shape memory alloy, and particularly to a drive unit for moving a drive body to a specific operational position by using a shape memory alloy which exhibits superelasticity when energized.

A drive unit generally includes a shape memory alloy member made from a shape memory alloy containing titanium (Ti) and nickel (Ni) and a drive body connected to the shape memory alloy member, wherein the drive body is moved by energizing the shape memory alloy member.

Figure 7:
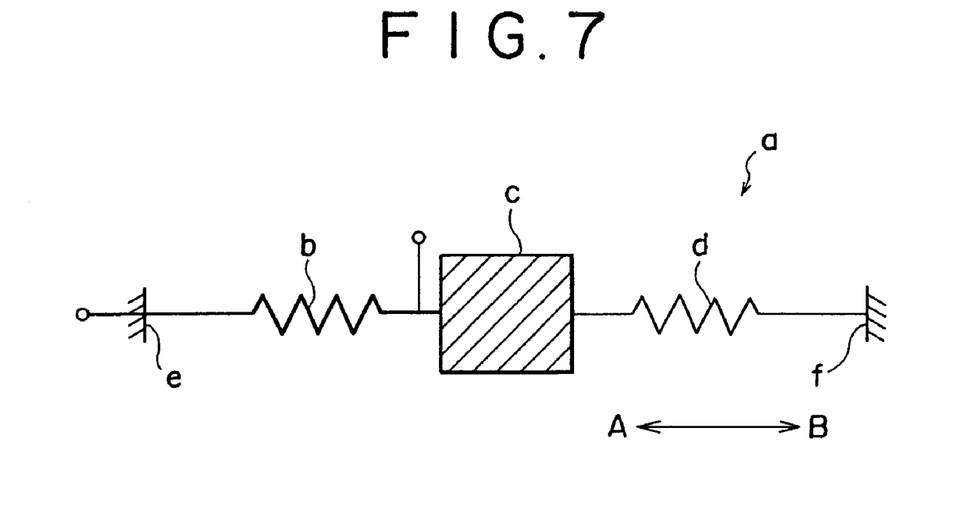
FIG. 7 is a schematic diagram of a related art drive unit using a shape memory alloy, showing a state in which a drive body is retained at a stopping position.
Figure 8:
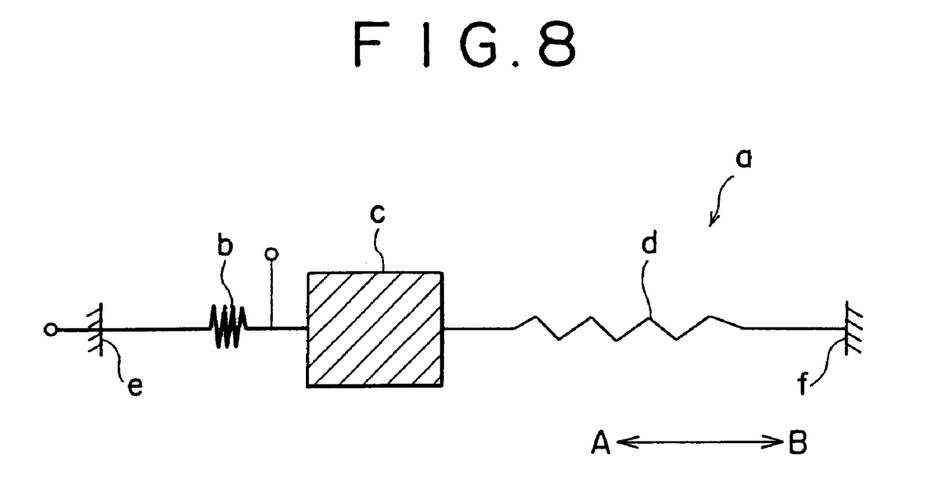
FIG. 8 is a schematic diagram of the drive unit shown in FIG. 7, showing a state in which the drive body is retained at an operational position.

FIGS. 7 and 8 show a related art drive unit "a" using a shape memory alloy.

The drive unit "a" is composed of a shape memory alloy spring "b" made from a shape memory alloy, a drive body "c", and a bias spring "d".

The shape memory alloy spring "b" is arranged such that one end is connected to the left side surface of the drive body "c" and the other end is fixed to a first fixing wall "e". The bias spring "d" is arranged such that one end is connected to the right side surface of the drive body "c" and the other end is fixed to a second fixing wall "f".

The shape memory alloy spring "b" is electrically connected to a power source (not shown). When energized by the power source, the shape memory alloy spring "b" exhibits superelasticity, and is thereby contracted to move the drive body "c" in the direction A from a stopping position shown in FIG. 7 to an operational position shown in FIG. 8.

When the energization of the shape memory alloy spring "b" is released, the drive body "c" is returned in the direction B from the operational position shown in FIG. 8 to the stopping position shown in FIG. 7 by the biasing force of the bias spring "d".

The above-described related art drive unit "a", however, has a problem. Since it is required to continue the energization of the shape memory alloy spring "b" for retaining the drive body "c" at the operational position, the power consumption becomes large. In particular, since the shape memory alloy containing Ti and Ni has a small inner resistance, the power consumption upon energization thereof becomes much larger. This brings a large obstacle to put the drive unit using the shape memory alloy into practical use.

The related art drive unit "a" also causes the following inconvenience: namely, in the case of retaining the drive body "c" at the operational position by continuing the energization of the shape memory alloy spring "b", the drive body "c" tends to be oscillated, resulting in wobbling of the drive body "c" at the operational position.

SUMMARY OF THE INVENTION

An object of the present invention is therefore to provide a drive unit using a shape memory alloy, which is capable of reducing the power consumption while overcoming the above mentioned problems.

To achieve the above object, according to the present invention, there is provided a drive unit using a shape memory alloy, including: a shape memory alloy member made from a shape memory alloy, the shape memory alloy member exhibiting superelasticity when being energized; a drive body connected to the shape memory alloy member, the drive body being moved from a stopping position to a specific operational position when the shape memory alloy member is energized; and a locking mechanism for retaining the drive body at the specific operational position.

With this configuration, since it is not required to continue the energization of the shape memory alloy member for retaining the drive body at the specific operational position, it is possible to significantly reduce the power consumption.

The locking mechanism may be provided with a locking portion, and the drive body may be integrally provided with a portion to be locked with the locking portion. With this configuration, it is possible to reduce the number of parts and to certainly retain the drive body at the specific operational position.

The locking mechanism may be additionally provided with a locking-releasing mechanism for releasing the retention of the drive body at the specific operational position. With this configuration, it is not required to provide a locking-releasing mechanism separately from the locking mechanism. Accordingly, it is possible to reduce the number of parts and simplify the mechanism, and hence to miniaturize the drive unit using a shape memory alloy and reduce the production cost of the drive unit.

The locking-releasing mechanism may be provided with an extensible/contractible member which is made from a shape memory alloy and exhibits superelasticity when being electrified, whereby the retention of the drive body at the specific operational position is released by energizing the extensible/contractible member. With this configuration, it is possible to easily control the locking-releasing mechanism and certainly release the locking state of the drive body, and hence to ensure the desirable operational state of the drive unit.

The drive unit may further include a bias spring, connected to the drive body, for retaining the drive unit at the stopping position. With this configuration, it is possible to certainly retain the drive body at the stopping position and hence to optimize the operation of the drive unit.

DETAILED DESCRIPTION OF THE PREFERRED EMBODIMENTS

Hereinafter, embodiments of a drive unit using a shape memory alloy according to the present invention will be described with reference to the accompanying drawings. In the drawings, members each being made from a shape memory alloy are schematically designated by thick lines for an easy understanding.

Figure 2:
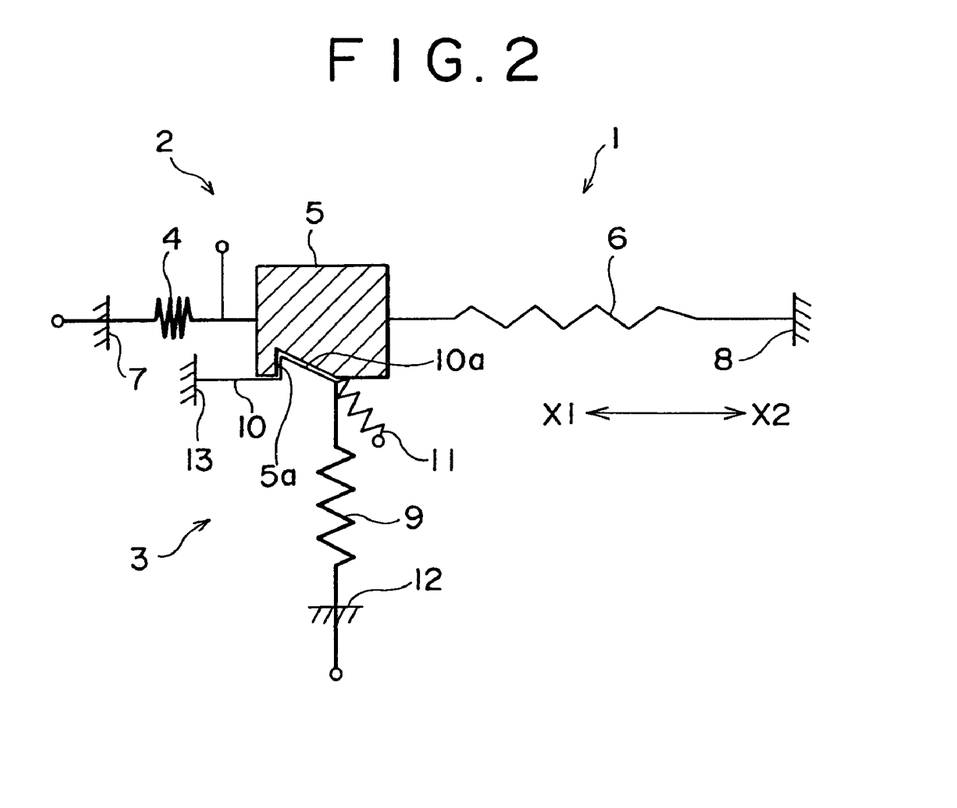
FIG. 2 is a schematic diagram of the drive unit shown in FIG. 1, showing a state in which the drive body is retained at an operational position.
Figure 3:
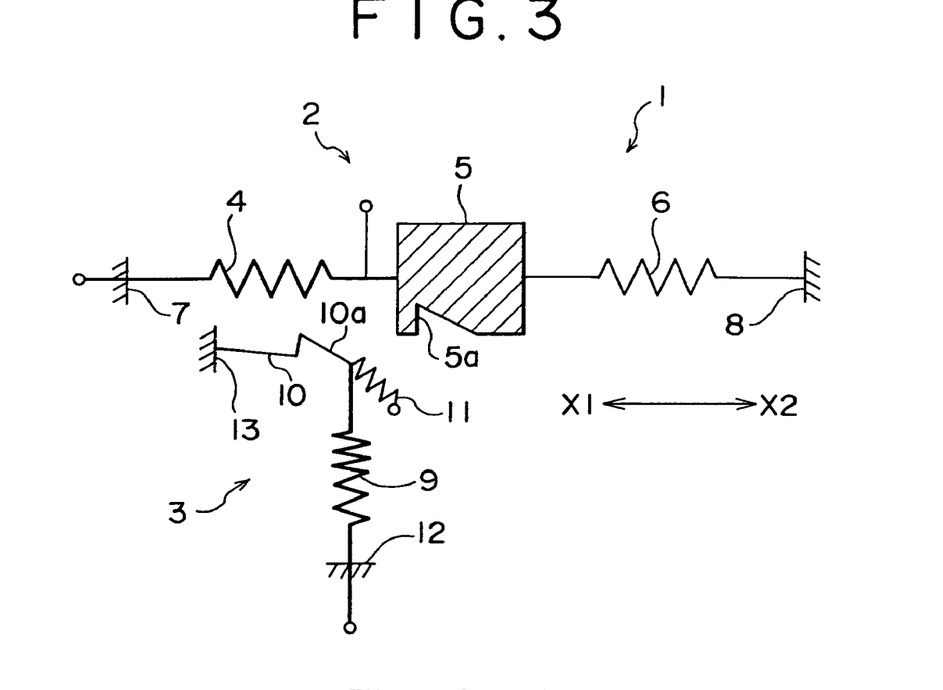
FIG. 3 is a schematic diagram of the drive unit shown in FIG. 1, showing a state in which the locking state of the drive body by a locking mechanism is released.

First, a drive unit 1 using a shape memory alloy according to the first embodiment will be described with reference to FIGS. 1 to 3.

The drive unit 1 using a shape memory alloy according to the present invention is composed of a drive mechanism 2 and a locking mechanism 3. The drive mechanism 2 includes a shape memory alloy member 4, a drive body 5, and a coil-shaped bias spring 6. The shape memory alloy member 4 is configured as a shape memory alloy tensile coil spring.

The shape memory alloy member 4 is arranged such that one end is connected to the left side surface of the drive body 5 and the other end is fixed to a first fixing wall 7. The shape memory alloy member 4 is electrically connected to a first power source (not shown).

The bias spring 6 configured as a tensile coil spring is arranged such that one end is connected to the right side surface of the drive body 5 and the other end is fixed to a second fixing wall 8. Accordingly, the drive body 5 is usually biased in the direction X2 shown in FIGS. 1 to 3 by the biasing force of the bias spring 6.

The bottom surface of the drive body 5 has a notch-shaped recess as a portion 5*a* to be locked with the locking mechanism 3.

The locking mechanism 3 includes an extensible/contractible member 9 made from a shape memory alloy, a locking member 10, and a bias spring 11.

The extensible/contractible member 9 is configured as a tensile coil spring extending in the vertical direction, and is fixed at its lower end to a third fixing wall 12. The extensible/contractible member 9 is electrically connected to a second power source (not shown), and is energized by the second power source.

The locking member 10 is formed, for example, by bending a metal plate, and has a locking portion 10*a*, part thereof projecting upwardly. The locking member 10 is arranged such that one end is fixed to a fourth fixing wall 13 and the other end is connected to the upper end of the extensible/contractible member 9.

The bias spring 11 is configured as a compression coil spring, and one end thereof is connected to a connection point between the extensible/contractible member 9 and the locking member 10. The bias spring 11 retains, by its biasing force, the locking member 10 at an engagement position where the locking portion 10*a* of the locking member 10 can be engaged with the portion 5*a* to be locked of the drive body 5 (see FIG. 1).

The operation of the drive unit 1 using a shape memory alloy will be described below.

Figure 1:
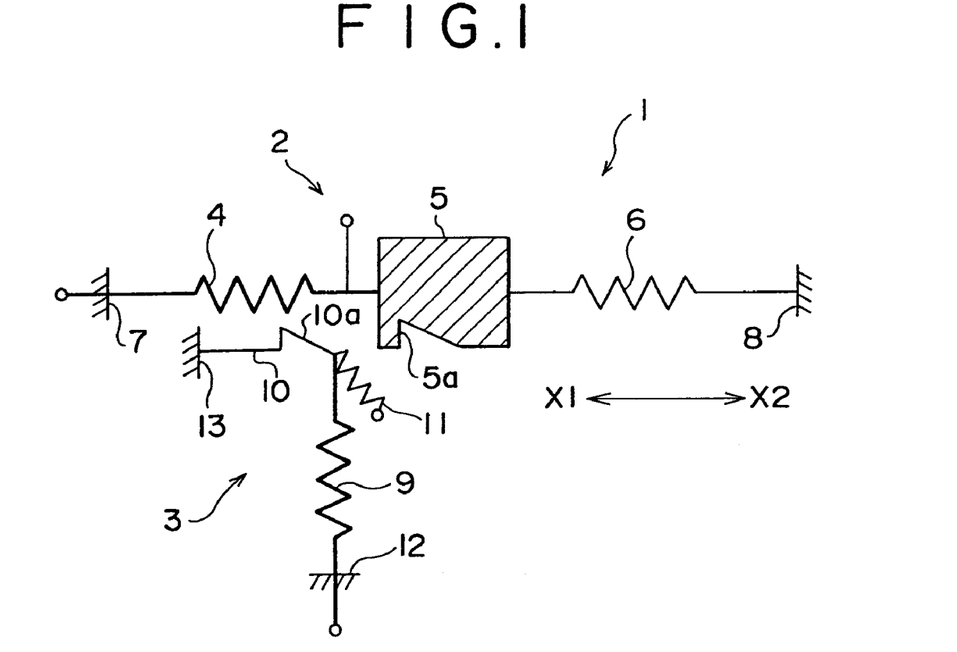
FIG. 1 is a schematic diagram of a first embodiment of a drive unit using a shape memory alloy according to the present invention, showing a state in which a drive body is retained at a stopping position.

In a state in which the shape memory alloy member 4 of the drive mechanism 2 is not energized, the drive body 5 is retained at a stopping position by the biasing force of the bias spring 6 (see FIG. 1). In this state, as described above, the locking member 10 of the locking mechanism 3 is retained, by the biasing force of the bias spring 11, at the engagement position where the locking portion 10*a* can be engaged with the portion 5*a* to be locked of the drive body 5 (see FIG. 1).

When energized by the first power source, the shape memory alloy member 4 exhibits superelasticity, and is thereby contracted to move the drive body 5 in the direction X1 shown in the figures against the biasing force of the bias spring 6.

When the drive body 5 is moved in the direction X1 until part of the drive body 5 is brought into contact with the locking portion 10*a* of the locking member 10 located at the engagement position, the locking portion 10*a* is deflected downwardly. When the drive body 5 is further moved in the direction X1 until the drive body 5 reaches an operational position, the locking portion 10*a* having been deflected is returned to the original state to be engaged with the portion 5*a* to be locked (see FIG. 2).

When the locking portion 10*a* is engaged with the portion 5*a* to be locked, the energization of the shape memory alloy member 4 by the first power source is released. At this time, since the portion 5*a* to be locked of the drive body 5 is engaged with the locking portion 10*a* of the locking member 10, the movement of the drive body 5 in the direction X2 by the biasing force of the bias spring 6 is restricted by the locking portion 10*a*, with a result that the drive body 5 is retained at the operational position.

When the extensible/contractible member 9 of the locking mechanism 3 is energized by the second power source in the state in which the drive body 5 is retained at the operational position, the extensible/contractible member 9 exhibits superelasticity and is thereby contracted to displace the locking member 10 downwardly against the biasing force of the bias spring 11. When the locking member 10 is displaced downwardly, the engagement between the locking portion 10*a* and the portion 5*a* to be locked of the drive body 5 is released. As a result, the drive body 5 is moved in the direction X2 by the biasing force of the bias spring 6 to be returned to the stopping position (see FIG. 3). Accordingly, the locking mechanism 3 also has a function as a locking-releasing mechanism for releasing the locking state of the drive body 5 retained at the operational position.

According to this embodiment, since the locking mechanism 3 serves as the locking-releasing mechanism as described above, it is not required to provide a locking-releasing mechanism separately from the locking mechanism 3. Accordingly, it is possible to reduce the number of parts and simplify the mechanism, and hence to miniaturize the drive unit 1 using a shape memory alloy and reduce the production cost of the drive unit 1.

When the locking member 10 is displaced downwardly and the engagement between the locking portion 10*a* and the portion 5*a* to be locked is released, the energization of the extensible/contractible member 9 by the second power source is released, and the extensible/contractible member.9 having been contracted is returned to the original state. As a result, the locking member 10 is returned to the engagement position by the biasing force of the bias spring 11.

The drive unit 1 using a shape memory alloy according to this embodiment has the following advantages:

Since the drive unit 1 is provided with the locking mechanism 3 for retaining the drive body 5 at the operational position, it is not required to continue the energization of the shape memory alloy member 4 for retaining the drive body 5 at the operational position, so that it is possible to significantly reduce the power consumption.

Since the drive body 5 is provided with the portion 5*a* to be locked with the locking portion 10*a* of the locking member 10, it is possible to reduce the number of parts and to certainly retain the drive body 5 at the operational position.

Since the drive unit 1 using a shape memory alloy is provided with the extensible/contractible member 9 which exhibits superelasticity when energized as the locking-releasing mechanism, it is possible to easily control the locking-releasing mechanism and certainly release the locking state of the drive body 5, and hence to ensure the desirable operational state of the drive unit 1.

Since the drive unit 1 using a shape memory alloy is provided with the bias spring 6 for retaining the drive body 5 at the stopping position, it is possible to certainly retain the drive body 5 at the stopping position and hence to optimize the operation of the drive unit 1.

Although each of the shape memory alloy member 4 and the bias spring 6 in the drive unit 1 is configured as a tensile coil spring, it may be configured as a compression coil spring. Further, the shape memory alloy member 4 is not limited to the coil-shaped spring but also may be a strand-shaped spring or a wire-shaped spring.

The portion 5a to be locked of the drive body 5, which is configured as the notch-like recess in this embodiment, may be configured as a projection.

Further, in the drive unit 1 using a shape memory alloy according to this embodiment, the release of the engagement between the locking portion 10a of the locking member 10 and the portion 5a to be locked of the drive body 5 is performed by energizing the extensible/contractible member 9 made from a shape memory alloy; however, the release of the engagement between the locking portion 10a and the portion 5a to be locked may be performed by using a mechanical locking-releasing mechanism. In this case, since a power required for releasing the engagement is saved, it is possible to further reduce the power consumption.

Figure 5:
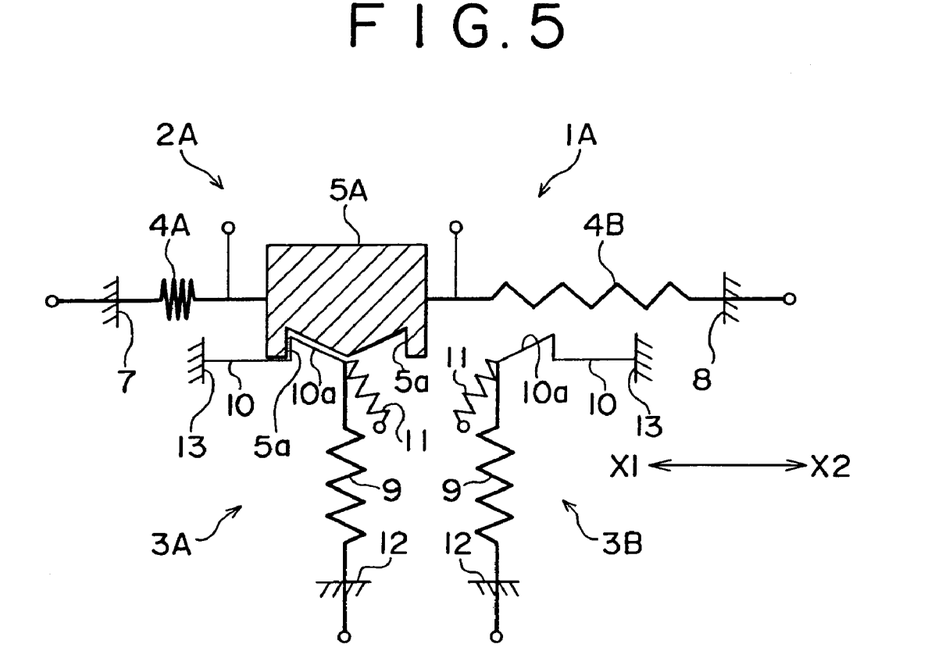
FIG. 5 is a schematic diagram of the drive unit shown in FIG. 4, showing a state in which the drive body is retained at an operational position on one side.
Figure 6:
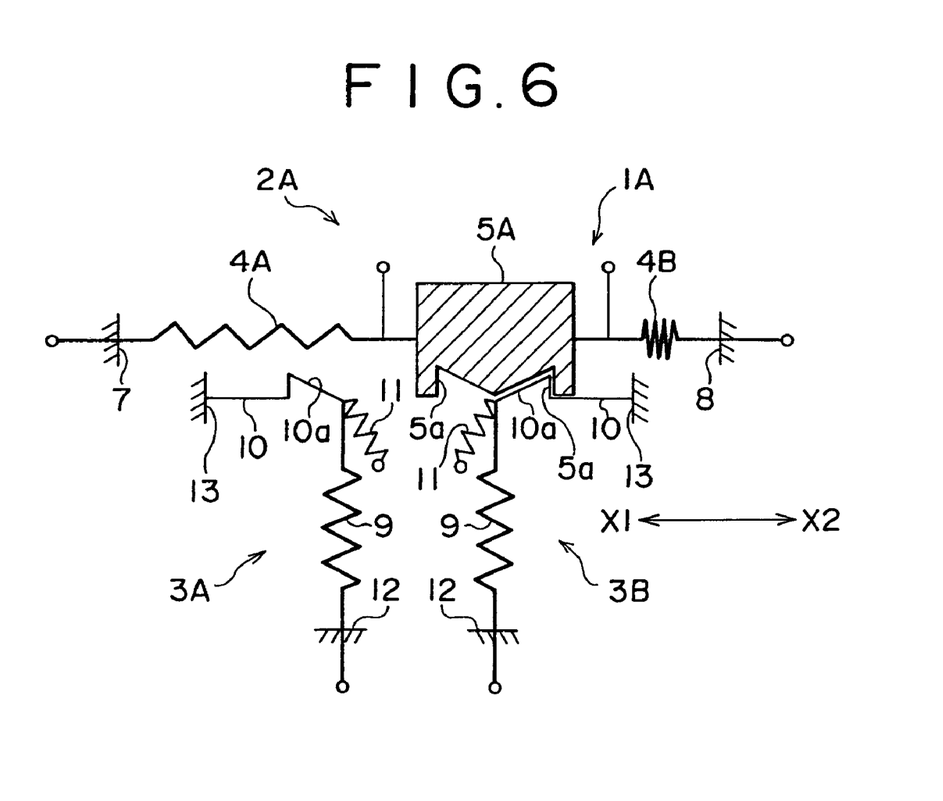
FIG. 6 is a schematic diagram of the drive unit shown in FIG. 4, showing a state in which the drive body is retained at an operational position on the other side.

Next, a drive unit 1A using a shape memory alloy according to a second embodiment will be described with reference to FIGS. 4 to 6.

The drive unit 1A is different from the above-described drive unit 1 in that two locking mechanism 3A and 3B are provided; the bias spring 6 is not provided and a drive body 5A is connected to two shape memory alloy members 4A and 4B and is kept in balance by these members 4A and 4B; and the drive body 5A is provided with two portions 5a to be locked. In the following description of the drive unit 1A using a shape memory alloy, therefore, only parts different from those of the drive unit 1 will be described, and the same parts as those of the drive unit 1 are designated by the same characters and the overlapped description thereof is omitted.

The drive unit 1A using a shape memory alloy is composed of a drive mechanism 2A and the two locking mechanism 3A and 3B. The drive mechanism 2A includes the two shape memory alloy members 4A and 4B, and the drive body 5A.

The shape memory alloy member 4A is arranged such that one end is connected to the left side surface of the drive body 5A and the other end is fixed to a first fixing wall 7, and can be energized by a power source (not shown). Similarly, the shape memory alloy member 4B is arranged such that one end is connected to the right side surface of the drive body 5A and the other end is fixed to a second fixing wall 8, and can be energized by a power source (not shown).

The two portions 5a to be locked are formed on the lower surface of the drive body 5A in such a manner as to be right/leftwise symmetrical.

The locking mechanisms 3A and 3B, each of which has the same configuration as that of the locking mechanism 3 in the first embodiment, are spaced from each other in such a manner as to be right/leftwise symmetrical with respect to a stopping position of the drive body 5A.

The operation of the drive unit 1A using a shape memory alloy will be described below.

Figure 4:
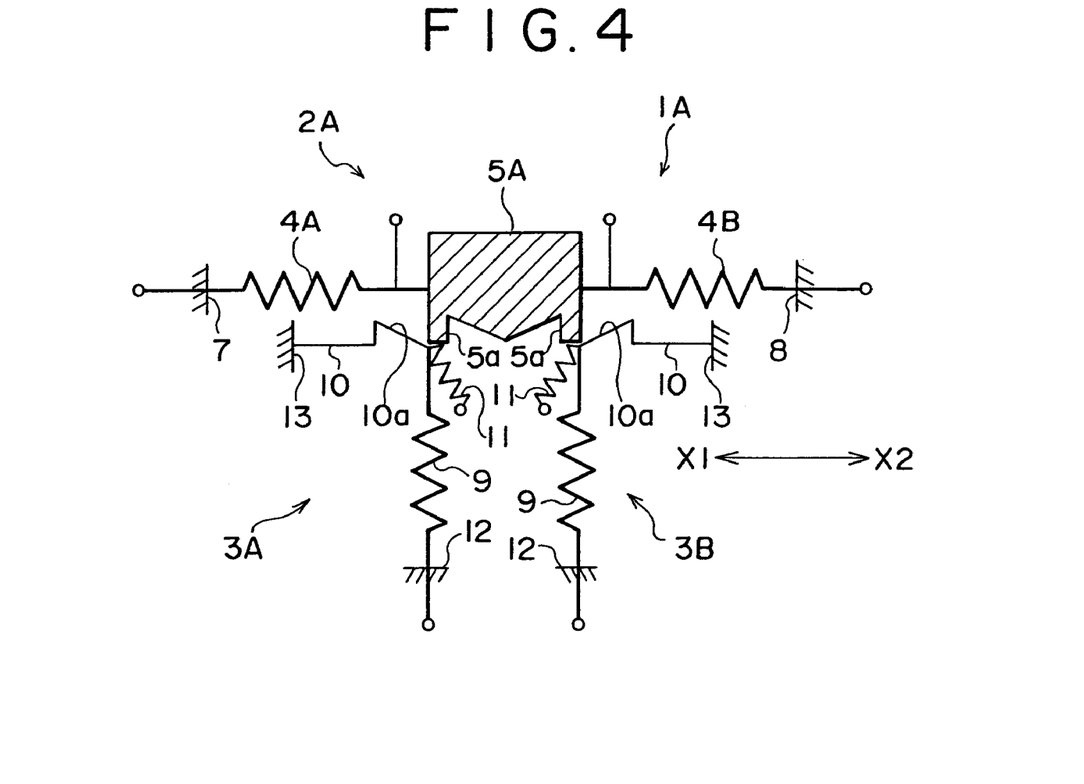
FIG. 4 is a schematic diagram of a second embodiment of the drive unit using a shape memory alloy according to the present invention, showing a state in which a drive body is retained at a stopping position.

In a state in which the shape memory alloy members 4A and 4B of the drive mechanism 2A are not energized, the drive body 5A is retained at the stopping position by the balance between the shape memory alloy members 4A and 4B (see FIG. 4). In this state, the locking members 10 of the locking mechanism 3A and 3B are retained, by the biasing forces of bias springs 11, at positions where the locking portions 10a can be engaged with the portions 5a to be locked of the drive body 5A (see FIG. 4).

When only the shape memory alloy member. 4A is energized, it exhibits superelasticity and is thereby contracted to move the drive body 5A in the direction X1 shown in the figures.

When the drive body 5A is moved in the direction X1 until part of the drive body 5A is brought into contact with the locking portion 10a of the locking member 10 provided for the locking mechanism 3A located at the engagement position, the locking portion 10a is deflected downwardly. When the drive body 5A is further moved in the direction X1 until the drive body 5A reaches an operational position on the direction X1 side, the locking portion 10a having been deflected is returned to the original state to be engaged with the portion 5a to be locked on the left side (see FIG. 5).

When the locking portion 10a is engaged with the portion 5a to be locked, the energization of the shape memory alloy member 4A is released. At this time, the drive body 5A is biased in the direction X2 by the shape memory alloy member 4B; however, since the portion 5a to be locked of the drive body 5A is engaged with the locking portion 10a of the locking member 10, the movement of the drive body 5A in the direction X2 is restricted, with a result that the drive body 5A is retained at the operational position on the direction X1 side (see FIG. 5)

When only an extensible/contractible member 9 of the locking mechanism 3A is energized in the state in which the drive body 5A is retained at the operational position, the extensible/contractible member 9 exhibits superelasticity and is thereby contracted to displace the locking member 10 downwardly against the biasing force of the bias spring 11. When the locking member 10 is displaced downwardly, the engagement between the locking portion 10a and the portion 5a to be locked of the drive body 5A is released. As a result, the drive body 5A is moved in the direction X2 by the biasing force of the shape memory alloy member 4B to be returned to the stopping position (see FIG. 4).

When the locking member 10 of the locking mechanism 3A is displaced downwardly and the engagement between the locking portion 10a and the portion 5a to be locked is released, the energization of the extensible/contractible member 9 is released, and the extensible/contractible member 9 having been contracted is returned to the original state. As a result, the locking member 10 is returned to the engagement position by the biasing force of the bias spring 11.

When only the shape memory alloy member 4B is energized in the state in which the drive body 5A is retained at the stopping position (see FIG. 4), the shape memory alloy member 4B exhibits superelasticity and is thereby contracted to move the drive body 5A in the direction X2 shown in the figures. As a result, the portion 5a to be locked on the right side of the drive body 5A is engaged with the locking portion 10a of the locking member 10 of the locking mechanism 3B (see FIG. 5). Accordingly, the movement of the drive body 5A in the direction X1 is restricted by the locking mechanism 3B, with a result that the drive body 5A is retained at an operational position on the direction X2 side (see FIG. 6).

When only an extensible/contractible member 9 of the locking mechanism 3B is energized in the state in which the drive body 5A is retained at the operational position, the extensible/contractible member 9 exhibits superelasticity and is-thereby contracted to release the engagement between the locking portion 10a of the locking member 10 and the portion 5a to be locked of the drive body 5A. As a result, the drive body 5A is moved in the direction X1 by the biasing force of the shape memory alloy member 4A so as to be returned to the stopping position (see FIG. 4). Then, the energization of the extensible/contractible member 9 of the locking mechanism 3B is released, so that the locking member 10 is returned to the engagement position by the biasing force of the bias spring 11.

The drive unit 1A using a shape memory alloy according to this embodiment has the following advantages:

Like the drive unit 1 in the first embodiment, the drive unit 1A is provided with the locking mechanisms 3A and 3B for retaining the drive body 5A at the operational positions. Accordingly, since it is not required to continue the energization of the shape memory alloy member 4A or 4B for retaining the drive body 5A at the operational position either on the direction X1 side or on the direction X2 side, it is possible to significantly reduce the power consumption.

Since the drive unit 1A is configured such that the drive body 5A can be retained at the operational positions in the two directions, it is possible to use the drive unit 1A as a multifunctional unit.

In addition, the drive body 5A is moved in the X1 and X2 directions in this embodiment; however, it may be moved in a direction different therefrom, or may be moved in three or more directions.

In the drive unit 1A using a shape memory alloy, each of the shape memory alloy members 4A and 4B is configured as a tensile coil spring; however, it may be configured as a compression coil spring. Further, each of the shape memory alloy members 4A and 4B is not limited to the coil-shaped spring but may be a strand-shaped spring or a wire-shaped spring.

Further, the release of the engagement between the locking portion 10a of the locking member 10 and each portion 5a to be locked of the drive body 5A may be performed by using a mechanical locking-releasing mechanism.

While the preferred embodiments of the present invention have been described using specific terms, such description is for illustrative purposes only, and it is to be understood that changes and variations may be made without departing from the spirit or scope of the following claims.

What is claimed is:

1. A drive unit using a shape memory alloy, comprising:
    a shape memory alloy member made from a shape memory alloy, said shape memory alloy member exhibiting superelasticity when being energized;
    a drive body connected to said shape memory alloy member, said drive body being moved from a stopping position to a specific operational position when said shape memory alloy member is energized; and
    a locking mechanism for retaining said drive body at said specific operational position, wherein said locking mechanism is provided with a locking portion, said drive body is integrally provided with a portion to be locked with said locking portion, and said locking mechanism is additionally provided with a locking-releasing mechanism responsive to an extensible/contractible member made from a shape memory alloy and that exhibits superelasticity when being electrified, whereby the retention of said drive body at said specific operational position is released by energizing said extensible/contractible member.

2. A drive unit using a shape memory alloy, comprising:
    a shape memory alloy member made from a shape memory alloy, said shape memory alloy member exhibiting superelasticity when being energized;
    a drive body connected to said shape memory alloy member, said drive body being moved from a stopping position to a specific operational position when said shape memory alloy member is energized;
    a locking mechanism for retaining said drive body at said specific operational position, and
    a bias spring, connected to said drive body, for retaining said drive body at the stopping position.

3. A drive unit using a shape memory alloy, comprising:
    a shape memory alloy member made from a shape memory alloy, said shape memory alloy member exhibiting superelasticity when being energized;
    a drive body connected to said shape memory alloy member, said drive body being moved from a stopping position to a specific operational position when said shape memory alloy member is energized;
    a locking mechanism for retaining said drive body at said specific operational position, wherein said locking mechanism is provided with a locking portion; and
    said drive body is integrally provided with a portion to be locked with said locking portion, and
    a bias spring, connected to said drive body, for retaining said drive body at the stopping position.

4. A drive unit using a shape memory alloy, comprising:
    a shape memory alloy member made from a shape memory alloy, said shape memory alloy member exhibiting superelasticity when being energized;
    a drive body connected to said shape memory alloy member, said drive body being moved from a stopping position to a specific operational position when said shape memory alloy member is energized;
    a locking mechanism for retaining said drive body at said specific operational position, wherein said locking mechanism is additionally provided with a locking-releasing mechanism for releasing the retention of said drive body at said specific operational position, and
    a bias spring, connected to said drive body, for retaining said drive body at the stopping position.

5. A drive unit using a shape memory alloy, comprising:
    a shape memory alloy member made from a shape memory alloy, said shape memory alloy member exhibiting superelasticity when being energized;
    a drive body connected to said shape memory alloy member, said drive body being moved from a stopping position to a specific operational position when said shape memory alloy member is energized;
    a locking mechanism for retaining said drive body at said specific operational position, wherein said locking mechanism is provided with a locking portion, said drive body is integrally provided with a portion to be locked with said locking portion, and said locking mechanism is additionally provided with a locking-releasing mechanism for releasing the retention of said drive body at said specific operational position, and a bias spring, connected to said drive body, for retaining said drive body at the stopping position.

6. A drive unit using a shape memory alloy, comprising:

a shape memory alloy member made from a shape memory alloy, said shape memory alloy member exhibiting superelasticity when being energized;

a drive body connected to said shape memory alloy member, said drive body being moved from a stopping position to a specific operational position when said shape memory alloy member is energized;

a locking mechanism for retaining said drive body at said specific operational position, wherein said locking mechanism is additionally provided with a locking-releasing mechanism for releasing the retention of said drive body at said specific operational position, wherein said locking-releasing mechanism is provided with an extensible/contractible member which is made from a shape memory alloy and exhibits superelasticity when being electrified, whereby the retention of said drive body at said specific operational position is released by energizing said extensible/contractible member, and a bias spring, connected to said drive body, for retaining said drive body at the stopping position.

7. A drive unit using a shape memory alloy, comprising:

a shape memory alloy member made from a shape memory alloy, said shape memory alloy member exhibiting superelasticity when being energized;

a drive body connected to said shape memory alloy member, said drive body being moved from a stopping position to a specific operational position when said shape memory alloy member is energized;

a locking mechanism for retaining said drive body at said specific operational position, wherein said locking mechanism is provided with a locking portion, said drive body is integrally provided with a portion to be locked with said locking portion, and said locking mechanism is additionally provided with a locking-releasing mechanism for releasing the retention of said drive body at said specific operational position, and a bias spring, connected to said drive body, for retaining said drive body at the stopping position.

8. A drive unite using a shape memory alloy, comprising:

a shape memory alloy member made from a shape memory alloy, said shape memory alloy member exhibiting superelasticity when being energized;

a drive body connected to said shape memory alloy member, said drive body being moved from a stopping position to a specific operational position when said shape memory alloy member is energized;

a locking mechanism for retaining said drive body at said specific operational position; and locking-releasing means for releasing the retention of said drive body at said specific operational position, said locking-releasing means including an extensible/contractible member made from a shape memory alloy that exhibits superelasticity when being electrified.

* * * * *

UNITED STATES PATENT AND TRADEMARK OFFICE
CERTIFICATE OF CORRECTION

PATENT NO.   : 6,404,098 B1
DATED        : June 11, 2002
INVENTOR(S)  : Shun Kayama It is certified that error appears in the above-identified patent and that said Letters Patent is hereby corrected as shown below:

<u>Column 10,</u>
Line 16, replace "unite" with -- unit --.

Signed and Sealed this

Eighth Day of April, 2003

JAMES E. ROGAN
*Director of the United States Patent and Trademark Office*